United States Patent
Poon et al.

(10) Patent No.: US 7,593,039 B2
(45) Date of Patent: Sep. 22, 2009

(54) IMAGE CORRECTING METHOD, IMAGE CORRECTING APPARATUS, AND STORAGE MEDIUM HAVING PROGRAM STORED THEREON

(75) Inventors: Eunice Poon, Ontario (CA); Megumi Kanda, Tokyo (JP); Ian Clarke, Ontario (CA)

(73) Assignee: Seiko Epson Corporation, Tokyo (JP)

( * ) Notice: Subject to any disclaimer, the term of this patent is extended or adjusted under 35 U.S.C. 154(b) by 524 days.

(21) Appl. No.: 11/283,673

(22) Filed: Nov. 22, 2005

(65) Prior Publication Data

US 2006/0210188 A1 Sep. 21, 2006

(30) Foreign Application Priority Data

Nov. 29, 2004 (JP) ............................. 2004-344545
Mar. 2, 2005 (JP) ............................. 2005-057451

(51) Int. Cl.
H04N 5/228 (2006.01)
(52) U.S. Cl. .................................... 348/208.99; 396/54
(58) Field of Classification Search ................. 348/252, 348/208, 208.99, 208.4; 250/330; 382/199, 382/54, 254; 396/54
See application file for complete search history.

(56) References Cited

U.S. PATENT DOCUMENTS

| | | | | |
|---|---|---|---|---|
| 4,788,596 A | * | 11/1988 | Kawakami et al. | 348/208.11 |
| 6,034,723 A | * | 3/2000 | Fujimori | 348/207.99 |
| 6,046,768 A | * | 4/2000 | Kaneda et al. | 348/208.2 |
| 6,370,330 B2 | * | 4/2002 | Sekine et al. | 396/54 |
| 2003/0132384 A1 | * | 7/2003 | Sugiyama et al. | 250/330 |

FOREIGN PATENT DOCUMENTS

| | | | |
|---|---|---|---|
| JP | 05-323444 A | | 12/1993 |
| JP | 11-027574 A | | 1/1999 |
| JP | 11027574 A | * | 1/1999 |
| JP | 2000-115631 A | | 4/2000 |
| JP | 2001-211295 A | | 8/2001 |
| JP | 2003-087442 A | | 3/2003 |

\* cited by examiner

Primary Examiner—David L Ometz
Assistant Examiner—Ahmed A Berhan
(74) Attorney, Agent, or Firm—Sughrue Mion, PLLC

(57) ABSTRACT

An image correcting method includes: (a) acquiring original image information to be corrected; (b) setting a confirmation range for confirming an effect of a correction; (c) producing corrected image information; and (d) displaying, on an image display section, an original image based on the original image information and a corrected image based on the corrected image information. The confirmation range is set based on the original image information. The corrected image information is produced by correcting the original image information within the confirmation range.

19 Claims, 9 Drawing Sheets

IMAGE CORRECTING METHOD, IMAGE CORRECTING APPARATUS, AND STORAGE MEDIUM HAVING PROGRAM STORED THEREON

CROSS-REFERENCE TO RELATED APPLICATIONS

This application claims priority on Japanese Patent Application No. 2004-344545 filed Nov. 29, 2004 and Japanese Patent Application No. 2005-57451 filed Mar. 2, 2005, which are herein incorporated by reference.

BACKGROUND

1. Technical Field

The present invention relates to image correcting methods, image correcting apparatuses, and storage media having programs stored thereon.

2. Related Art

A photographic apparatus for converting an optical image of a photographed object (subject) into electrically produced image information and storing the resulting image information in a nonvolatile memory includes, for example, a digital camera. With a photographic apparatus of this type, the quality of images may be degraded due to hand-movement blurring or out-of-focus blurring. To improve the degraded quality of an image after having been photographed, an image correcting apparatus has been suggested (e.g., see JP-A-5-323444). Based on image information and blurring-path data stored in an image memory device, this image correcting apparatus makes a correction to the image information using the Fourier transform and the inverse Fourier transform.

This image correcting apparatus displays a corrected image on an image display section. Here, the image information obtained by the photographic apparatus is apt to exhibit a portion that distinctly reveals the effect of a correction and a portion that does not do so. Accordingly, an operator has by himself/herself to find the portion that distinctly reveals the effect of a correction, thus making the operation troublesome. To be worse, with a photographic apparatus such as a digital camera having a small screen, it is difficult to find a portion that distinctly reveals the effect of a correction, thus making the operation further troublesome.

SUMMARY

The present invention was developed in view of the aforementioned problems. It is therefore an object of the invention to realize an image correcting method, an image correcting apparatus, and a storage medium having a program stored thereon, which allow to precisely show the effect of a correction.

To achieve the foregoing object, a main invention provides the following image correcting method.

That is, an image correcting method includes:

(a) acquiring original image information to be corrected;

(b) setting, based on the original image information, a confirmation range for confirming an effect of a correction;

(c) correcting the original image information within the confirmation range to produce corrected image information; and (d) displaying, on an image display section, an original image based on the original image information and a corrected image based on the corrected image information.

The features and objects of the present invention other than those described above will become more apparent from the description of this specification when read with reference to the accompanying drawings.

DESCRIPTION OF EXEMPLARY EMBODIMENTS

Figure 1A:
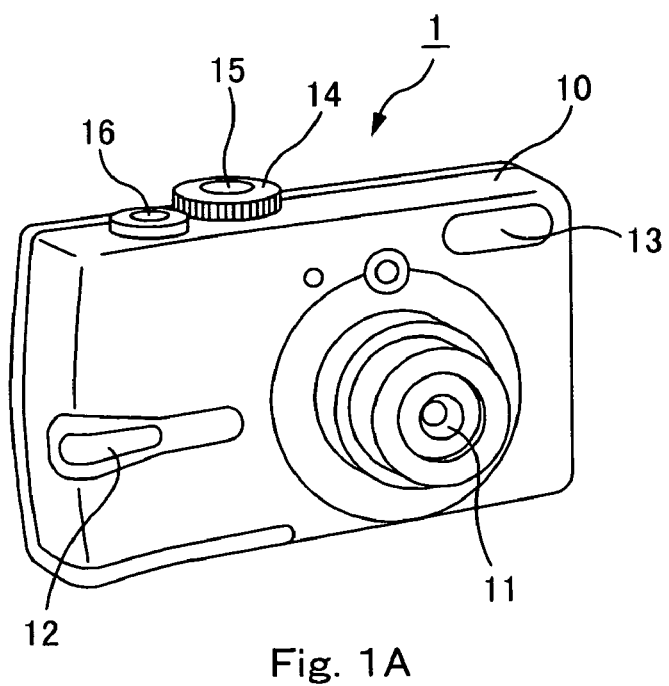
FIG. 1A is a perspective view illustrating the appearance of a digital camera.

From the description of this specification and that of the accompanying drawings, at least the following will become apparent.

That is, an image correcting method includes: (a) acquiring original image information to be corrected; (b) setting, based on the original image information, a confirmation range for confirming an effect of a correction; (c) correcting the original image information within the confirmation range to produce corrected image information; and (d) displaying, on an image display section, an original image based on the original image information and a corrected image based on the corrected image information.

According to such an image correcting method, a corrected image is produced over the confirmation range having been set by a controller, and this corrected image is displayed on the image display section, thereby making it possible to precisely show the effect of a correction.

Preferably, such an image correcting method further includes detecting an edge from the original image information, and based on the quantity of detected edges, setting the confirmation range.

According to such an image correcting method, the confirmation range is set based on the quantity of edges in the original image information, thereby making it possible to show the effect of a correction further precisely.

Preferably, such an image correcting method further includes dividing the original image information into a plurality of blocks, and setting the confirmation range so as to include a block with the maximum quantity of detected edges.

According to such an image correcting method, the confirmation range is defined based on blocks, thus making the method suitable for processing at higher speeds.

Preferably, such an image correcting method further includes detecting the edge based on hand-movement-blurring orientation information indicative of an orientation of hand-movement blurring; and correcting the hand-movement blurring of the original image information within the confirmation range to produce the corrected image information.

According to such an image correcting method, the effect of correcting hand-movement blurring that is apt to occur in a photographic apparatus can be precisely shown.

Preferably, such an image correcting method further includes detecting the edge based on the hand-movement-blurring orientation information output from a hand-movement-blurring-orientation input section, wherein the hand-movement-blurring-orientation input section outputs the hand-movement-blurring orientation information based on an orientation of hand-movement blurring that is entered.

According to such an image correcting method, the orientation of hand-movement blurring can be entered, thereby making it possible to readily know the relationship between the entered hand-movement-blurring orientation and the effect of a correction.

Preferably, such an image correcting method further includes finding the hand-movement-blurring orientation information from the original image information, and detecting the edge based on the hand-movement-blurring orientation information.

According to such an image correcting method, it is possible to simplify the operation and improve the usability.

Preferably, such an image correcting method further includes finding the hand-movement-blurring orientation information from the original image information and finding hand-movement-blurring amount information indicative of an amount of hand-movement blurring in accordance with the hand-movement-blurring orientation information; and correcting the hand-movement blurring of the original image information within the confirmation range in accordance with the hand-movement-blurring amount information.

According to such an image correcting method, it is possible to realize an image correcting method superior to a conventional one.

Preferably, such an image correcting method further includes, after displaying the corrected image on the image display section, confirming whether or not to modify the hand-movement-blurring orientation information.

According to such an image correcting method, a chance is given to modify the determined hand-movement-blurring orientation information, thereby making it possible to efficiently make a desired correction.

Preferably, such an image correcting method further includes, when the hand-movement-blurring orientation information is modified, correcting the original image information within the confirmation range that has been set prior to the time of the modification.

According to such an image correcting method, the confirmation range is fixed, thereby making it possible to readily compare the effect of a correction between before and after the modification.

Preferably, such an image correcting method further includes displaying, based on the hand-movement-blurring orientation information, an indicator image for indicating the orientation of hand-movement blurring.

According to such an image correcting method, it is possible to realize an image correcting method superior to a conventional one.

Preferably, such an image correcting method further includes displaying the indicator image overlapped on the original image.

According to such an image correcting method, it is possible to realize an image correcting method superior to a conventional one.

Preferably, such an image correcting method further includes displaying the indicator image on an indicator image display area of the image display section.

According to such an image correcting method, it is possible to realize an image correcting method superior to a conventional one.

Preferably, such an image correcting method further includes displaying the original image on an original image display area of the image display section; and displaying the corrected image on a corrected image display area of the image display section.

According to such an image correcting method, it is possible to contrast the original image displayed on the original image display area with the corrected image displayed on the corrected image display area, thereby allowing the effect of a correction to be easily confirmed visually.

Preferably, such an image correcting method further includes switching between the original image and the corrected image for display on the image display section.

According to such an image correcting method, a corrected image can be displayed without taking the original image into account.

Preferably, such an image correcting method further includes enlarging the corrected image for display on the image display section.

According to such an image correcting method, it is possible to optimally display a corrected image.

Preferably, such an image correcting method further includes storing corrected original image information in a storage medium in place of the original image information to be corrected.

According to such an image correcting method, it is possible to realize an image correcting method superior to a conventional one.

It is also possible to realize the following image display apparatus.

That is, An image correcting apparatus includes: (A) an image display section for displaying an image; and (B) a controller, wherein the controller (B1) acquires original image information to be corrected; (B2) sets, based on the original image information, a confirmation range for confirming an effect of a correction; (B3) corrects the original image information within the confirmation range to produce corrected image information; and (B4) displays, on the image display section, an original image based on the original image information and a corrected image based on the corrected image information.

According to such an image correcting apparatus, it is possible to precisely show the effect of a correction.

Preferably, in such an image correcting apparatus, the original image information may be stored in a storage medium by a photographic apparatus; and the photographic apparatus may include: a photoelectric conversion section for converting an optical image of a photographed object into electrically produced image information, and a shutter control section on which a predetermined manipulation is performed when storing the image information in the storage medium.

According to such an image correcting apparatus, it is possible to precisely show the effect of correcting the original image information stored by the photographic apparatus in the storage medium.

Preferably, such an image correcting apparatus may also be adapted such that the original image information is printed by a printing apparatus.

According to such an image correcting apparatus, it is possible to precisely show the effect of correcting the original image information that is to be printed by a printing apparatus.

It is also possible to realize the following storage medium having a program stored thereon.

That is, provided is a storage medium having a program stored thereon, the program including: a code for allowing a computer constituting an image correcting apparatus to operate to acquire original image information to be corrected from a storage medium; a code for allowing the computer to operate to set, based on the original image information, a confirmation range for confirming an effect of a correction; a code for allowing the computer to operate to correct the original image information within the confirmation range to produce corrected image information; and a code for allowing the computer to operate to display, on an image display section, an original image based on the original image information and a corrected image based on the corrected image information.

According to such a storage medium having a program stored thereon, it is possible to precisely show the effect of a correction.

First Embodiment

The image correcting apparatus can be realized in a variety of forms. For example, the image correcting apparatus can be realized by a personal computer having an image correction application program (such as retouch software) installed therein, a photographic apparatus such as a digital camera, and a printing apparatus such as an ink jet printer. However, it would be impossible to describe all conceivable forms of the image correcting apparatus. Accordingly, in this specification, a digital camera 1, which is a type of a photographic apparatus, will be described by way of example.

Digital Camera 1

<Appearance of the Digital Camera 1>

Figure 1B:
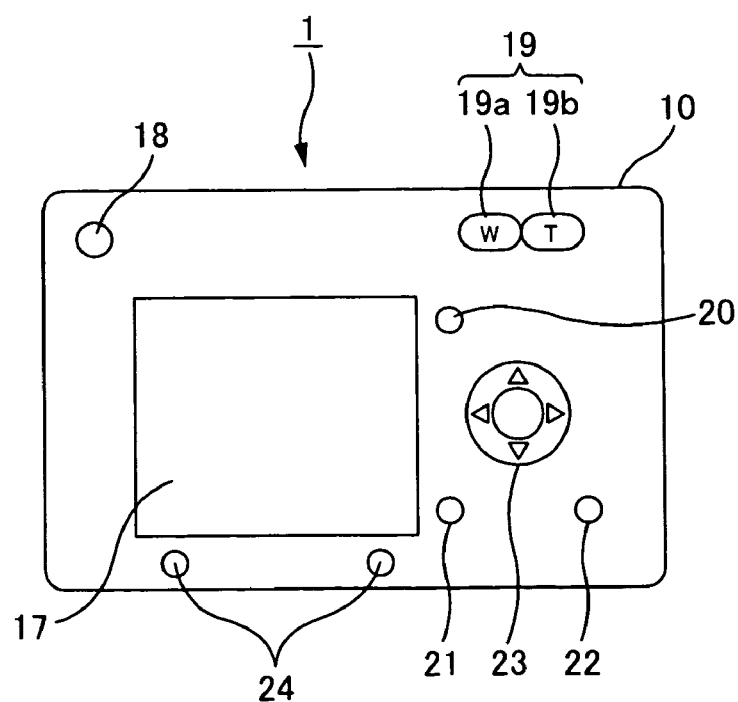
FIG. 1B is a rear view of a digital camera.
Figure 2:
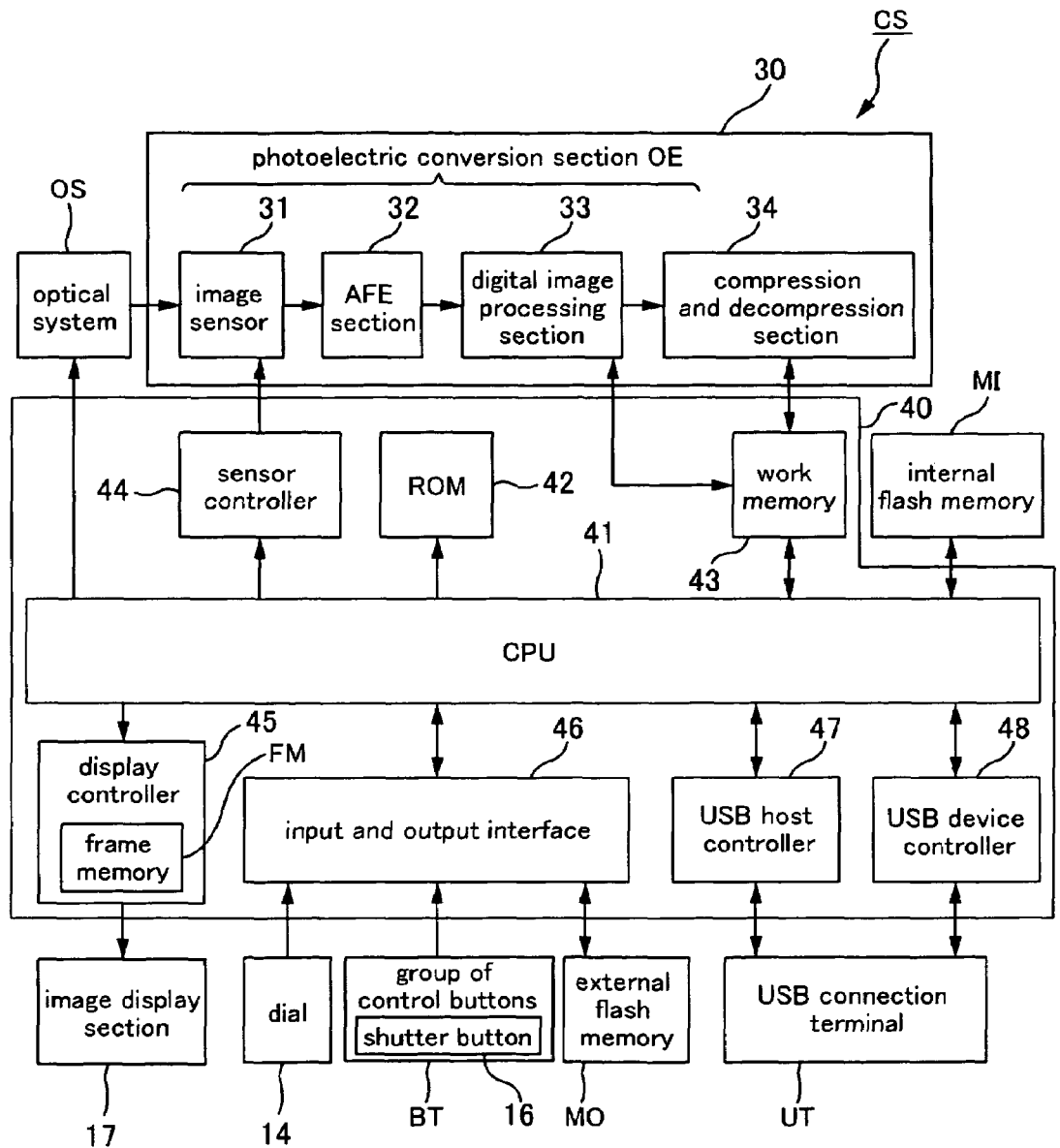
FIG. 2 is an explanatory block diagram illustrating the control system of the digital camera.

First, the appearance of the digital camera 1 will be described. Here, FIG. 1A is a perspective view illustrating the appearance of the digital camera 1. FIG. 1B is a rear view of the digital camera 1. FIG. 2 is an explanatory block diagram of a control system CS of the digital camera 1.

The digital camera 1 shown in FIG. 1A and FIG. 1B has a housing 10 for accommodating parts therein that constitute the control system CS. On the front of the housing 10, there are provided a lens 11, a self-timer indicator section 12, and a strobe 13. The lens 11, and an aperture and a shutter provided for the lens 11 (both not shown) constitute an optical system OS (see FIG. 2). The self-timer indicator section 12 serves to indicate that a self-timer is in operation. The strobe 13 is a light source that is used in a dark place or when taking a photograph against the sun. On the upper side of the housing 10, there are provided a mode dial 14, a power button 15, and a shutter button 16. The mode dial 14 is manipulated in selecting a mode of the digital camera 1 (such as a shooting mode or a correction mode). The mode dial 14 includes a dial-type change-over switch. The power button 15 is manipulated in turning ON/OFF the power of the digital camera 1. The power button 15 is located inside the mode dial 14.

The shutter button 16 is manipulated by the photographer to store image information. That is, a predetermined manipulation performed on the shutter button 16 allows image information at the time of the manipulation to be stored in an external flash memory MO or an internal flash memory MI. The shutter button 16 thus corresponds to the shutter control section. The illustrated shutter button 16 is of a push-button type and depressed to the deepest position, thereby allowing the image information to be stored in the external flash memory MO or the internal flash memory MI. Accordingly, depressing the shutter button 16 to the deepest position corresponds to the "predetermined manipulation." When depressed halfway down in the direction of depth (i.e., in a so-called halfway depressed condition), the shutter button 16 can perform an operation different from the operation for storing image information. For example, in a halfway depressed condition, the shutter button 16 allows a proper focus to be attained or exposure conditions (a shutter speed or an aperture) to be set.

The external flash memory MO is a nonvolatile memory that is removable from the digital camera 1. On the other hand, the internal flash memory MI is a nonvolatile memory incorporated into the digital camera 1. Both the external flash memory MO and the internal flash memory MI have a function of storing image information. Accordingly, the following description will be directed to a case where image information is stored in the external flash memory MO.

On the rear side of the housing 10, there are provided an image display section 17, and various types of buttons. The image display section 17 is formed, for example, of a liquid crystal display. The image display section 17 displays various types of images. For example, in the shooting mode, in which image information can be stored in the external flash memory MO, the image display section 17 displays a preview image based on the image information of a subject. Here, the image information of a subject means electrical information that is obtained through conversion by a photoelectric conversion section OE. Immediately after the shutter button 16 is depressed and image information is stored in the external flash memory MO, the image display section 17 displays an image based on the stored image information. On the other hand, in the correction mode, the image display section 17 displays an original image based on image information to be corrected (for convenience sake, also referred to as original image information), and a corrected image based on image information after having been corrected (for convenience sake, also referred to as corrected image information). The correction mode is intended for a process of correcting and updating the image information stored in the external flash memory MO. This correction mode will be discussed later. In addition, in a setting mode, in which various types of settings can be made to the digital camera 1, the image display section 17 displays a menu for setting operations.

The aforementioned buttons include a printing button 18, a zoom button 19, a menu button 20, a display button 21, a review button 22, a four-way button 23, and a selection button 24. These buttons and the aforementioned power button 15 and shutter button 16 constitute a group of control buttons BT.

The printing button 18 is used in printing the image information, which has been stored in the external flash memory MO, using a printing apparatus such as a printer. The zoom button 19 is used in driving a zooming mechanism (not shown) of the lens 11. The zoom button 19 is made up of a W button 19a that is manipulated in driving the lens 11 to a wide-angle side, and a T button 19b that is manipulated in driving the lens 11 to a telephoto side. The menu button 20 is manipulated in displaying various types of menus. The display button 21 is manipulated in switching between displaying and non-displaying operations of the image display section 17. The review button 22 is manipulated in displaying on the image display section 17 the image information stored in the external flash memory MO. The four-way button 23 and the selection button 24 are manipulated in, for example, selecting, determining, or canceling operations on a menu. The four-way button 23 is also used by the operator to input an orientation of hand-movement blurring in the correction mode. That is, at the time of entering an orientation of hand-movement blurring, the output from the four-way button 23 corresponds to hand-movement-blurring orientation information indicative of the orientation of hand-movement blurring. Accordingly, the four-way button 23 corresponds to a hand-movement-blurring-orientation input section (or a hand-movement-blurring-orientation-information output section) for delivering hand-movement-blurring orientation information in accordance with the entered orientation of hand-movement blurring.

<Control System CS of the Digital Camera 1>

Now, the control system CS of the digital camera 1 will be described. As shown in FIG. 2, the digital camera 1 has an image producing section 30, a controller 40, and a USB (Universal Serial Bus) connection terminal UT in addition to the aforementioned configuration.

The image producing section 30 has an image sensor 31, an analog front end section (AFE section) 32, a digital image processing section 33, and a compression and decompression section 34. The image sensor 31 has a plurality of cells associated with the number of pixels to output an electric signal associated with the quantity of exposure on a per cell basis. For example, employed as the image sensor 31 is a CCD (charge-coupled device) or CMOS (complementary metal-oxide semiconductor). The analog front end section 32 quantizes an electric signal delivered from the image sensor 31 for conversion into a digital signal. The analog front end section 32 performs gain control or analog to digital conversion.

The digital image processing section 33 performs an image forming process for forming image information from an electric signal delivered from the image sensor 31. In the image forming process, an electric signal is acquired which is associated with each color of R (Red), G (Green), and B (Blue), for example, and then raw image information is formed from the acquired electric signal of each color. The digital image processing section 33 also performs a white-balance correction, a y correction, or a color space conversion on the formed raw image information to produce image information (a digital image) indicative of a graduation value of R, G, and B or a graduation value of Y, Cb, and Cr. In this embodiment, image information including a graduation value of R, G, and B is created.

The compression and decompression section 34 compresses the image information created in the digital image processing section 33 or decompresses the compressed image information. In compressing image information, for example, performed is a serial transform (such as a discrete cosine transform or a wavelet transform) on a digital image, or entropy coding (such as Huffman coding). On the other hand, in decompressing the compressed image information, for example, the corresponding inverse transform is performed thereon.

In the image producing section 30 configured in this manner, the image sensor 31, the analog front end section 32, and the digital image processing section 33 constitute the photoelectric conversion section OE. The photoelectric conversion section OE converts an optical image of a subject imaged by the optical system OS such as the lens 11 into electrically produced image information.

The controller 40 has a CPU 41, a ROM 42, a work memory 43, a sensor controller 44, a display controller 45, an input and output interface 46, a USB host controller 47, and a USB device controller 48. The CPU 41 functions as a central processing unit and performs various control operations in accordance with operation programs stored in the ROM 42. The operation program has codes for implementing control operations. The ROM 42 stores the operation program and control parameters. The work memory 43 temporarily stores data. In this embodiment, the work memory 43 can be accessed from each of the CPU 41, the digital image processing section 33, and the compression and decompression section 34. Accordingly, the CPU 41 can acquire the image information produced in the digital image processing section 33 and the image information compressed in the compression and decompression section 34 via the work memory 43. The CPU 41 can also acquire the compressed image information in a decompressed condition. Furthermore, in the correction mode, the work memory 43 stores various types of information in addition to original image information to be corrected. As such, the controller 40 having the CPU 41, the ROM 42, and the work memory 43 functions as a so-called computer.

The sensor controller 44 is an operating circuit for operating the aforementioned image sensor 31. That is, the image sensor 31 operates according to a control signal from the sensor controller 44. For example, such an operation as switching between cells to be read is performed. The display controller 45 causes the image display section 17 to operate to display an image. The display controller 45 is provided with a frame memory FM capable of storing image information to be displayed on the image display section 17. At the time of shooting, the frame memory FM stores image information for preview use. When the image information is being corrected, the frame memory FM stores the original image information and the corrected image information.

The input and output interface 46 is electrically connected with the aforementioned mode dial 14, the control button group BT, and the external flash memory MO. Additionally, the input and output interface 46 receives a setting signal from the mode dial 14 and a manipulation signal from each button constituting the control button group BT (the power button 15, the shutter button 16, the printing button 18, the zoom button 19, the menu button 20, the display button 21, the review button 22, the four-way button 23, and the selection button 24). The input and output interface 46 stores image information in the external flash memory MO or reads out the image information stored in the external flash memory MO. In storing image information in the external flash memory MO, the CPU 41 provides a filename as identification information to the image information stored in the work memory 43.

<Brief Description of the Operation of the Digital Camera 1>

Figure 3:
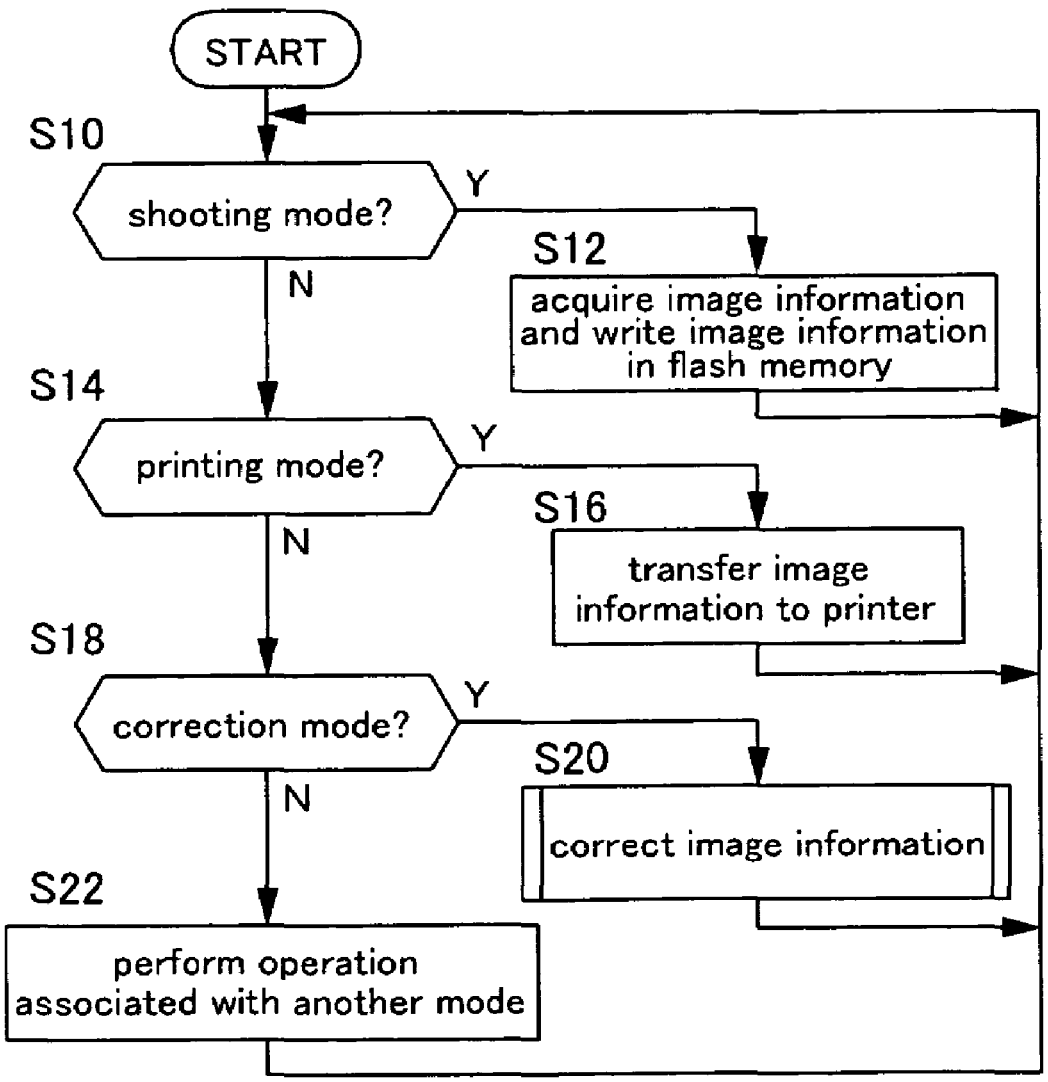
FIG. 3 is a flowchart schematically illustrating the operation of the digital camera.

Now, the operation of the digital camera 1 will be briefly described. Here, FIG. 3 is a flowchart briefly showing the operation of the digital camera 1. The digital camera 1 performs an operation associated with a selected mode. For example, when the shooting mode is selected with the menu button 20 (S10), a shooting operation such as acquiring image information or writing image information in the flash memory is performed (S12) On the other hand, when the printing button 18 is depressed to select a printing mode (S14), the image information is transferred to a printing apparatus such as a printer (S16). This allows for printing the image information. On the other hand, when the correction mode is selected with the menu button 20 (S18), the image information is corrected (S20). The correction of the image information will be discussed later. Furthermore, when another mode is selected, the operation associated with the selected mode is performed (S22). For example, a setup operation or a formatting operation of the external flash memory MO is performed. As described above, the operation of the digital camera 1 is controlled by the CPU 41 in accordance with the operation program stored in the ROM 42.

Summary of the Present Embodiment

<Background and Main Section>

After shooting, the digital camera 1 can correct the image information containing hand-movement blurring and out-of-focus blurring. If image information can be corrected after shooting in this way, an image that cannot be shot again could be preferably improved in image quality. Furthermore, if the digital camera 1 can perform this correction, the correction can be carried out without having to use a special device such as a personal computer, thereby improving usability. In addition, if the effect of a correction can be confirmed before overwriting image information to be corrected (original image information) with corrected image information, an unsuccessful correction will be preferably prevented. In this case, it is conceivable to display the corrected image information on the image display section 17 for confirmation by the operator, so that after the confirmation, the original image information is overwritten with the corrected image information. Here, image information is apt to have a portion that distinctly reveals the effect of a correction and a portion that does not do so. Accordingly, the operator has by himself/herself to find a portion that distinctly reveals the effect of a correction. At this time, if the operator selects a portion where the effect of a correction is less prone to appear, the operator may determine that the effect of the correction can be hardly obtained, and thus change the condition of the correction. Consequently, the condition of the correction may possibly deviate from a proper one.

Figure 9:
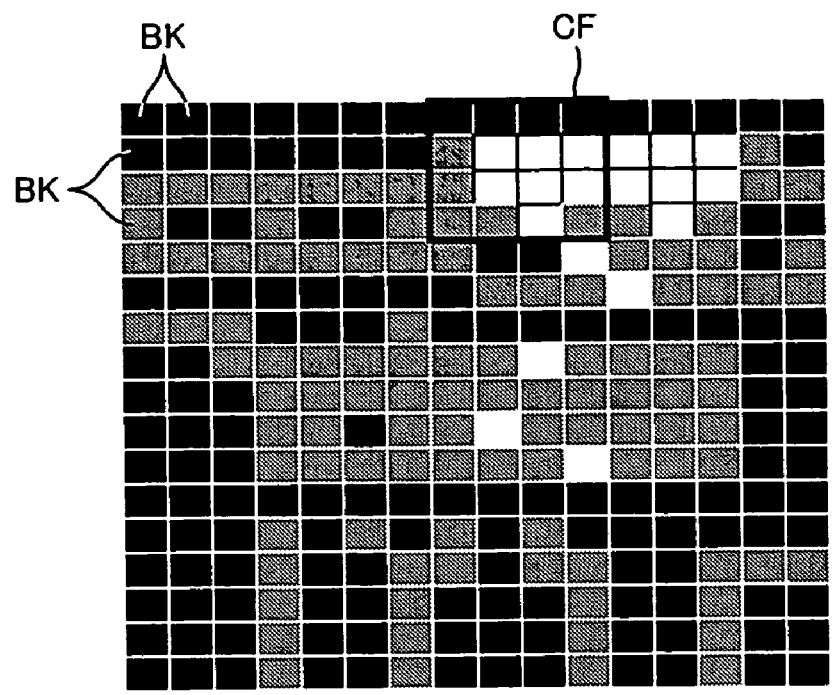
FIG. 9 is a schematic diagram showing the relationship between the edge strength and the block.

In view of such a situation, this embodiment allows the controller 40 to define a range suitable for confirming the effect of a correction (hereinafter also referred to as a confirmation range CF; see FIG. 9). The controller 40 then corrects the original image information within the confirmation range CF to acquire the corrected image information. The controller 40 also allows a corrected image based on the acquired corrected image information to be displayed on the image display section 17. Such an arrangement as employed allows a corrected image to be produced over the confirmation range CF defined by the controller 40 and then displayed on the image display section 17, thereby making it possible to let the user know precisely the effect of a correction. That is, a portion suitable for confirming a correction is selected from the original image information to be corrected, and the corrected image of the portion is displayed, thereby making it possible to precisely show the effect of a correction.

Correction of Image Information

Figure 4:
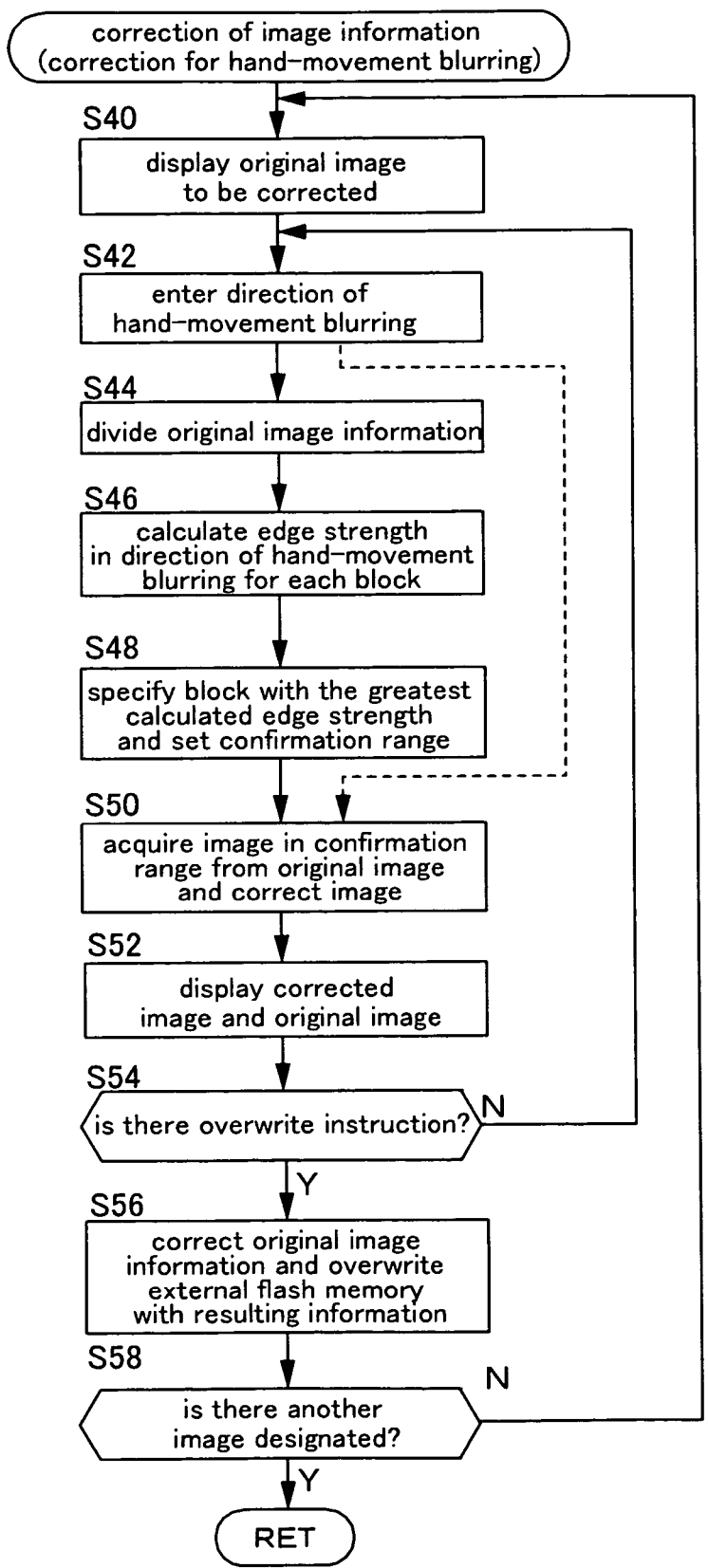
FIG. 4 is an explanatory flowchart showing the specific contents of an image information correction process (S20)
Figure 5:
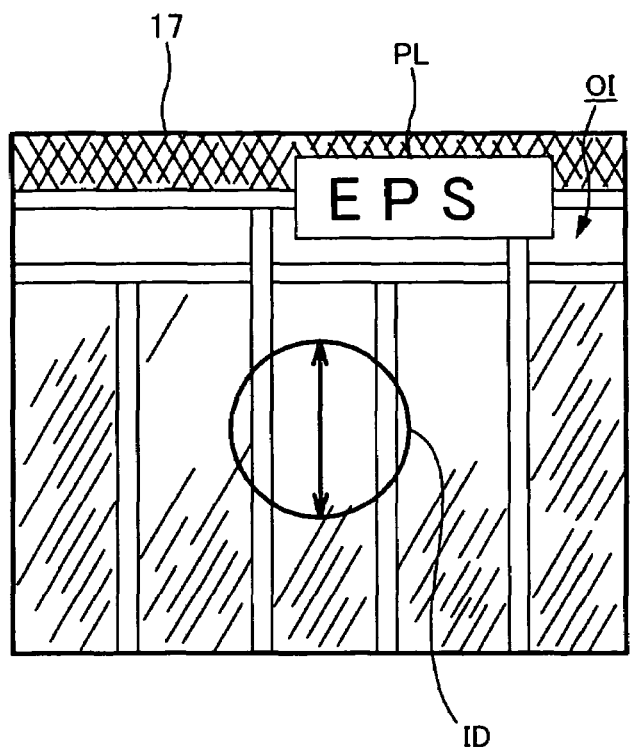
FIG. 5 is an explanatory schematic diagram illustrating an original image and an indicator image, which are displayed on an image display section.

Now, a correction of image information will be explained in detail. Here, FIG. 4 is an explanatory flowchart showing the specific contents of an image information correction process (S20), illustrating an example of a correction for hand-movement blurring. On the other hand, FIG. 5 is an explanatory schematic diagram illustrating an original image OI and an indicator image ID, which are displayed on the image display section 17.

When original image information to be corrected is specified, the controller 40 allows an original image OI based on the specified original image information to be displayed on the image display section 17 (S40). At this time, the controller 40 first acquires original image information to be corrected from the external flash memory MO (which corresponds to a storage medium). This original image information is stored in the work memory 43. Then, information for displaying an original image OI (for convenience sake, also referred to as "original image information for display") is created from the original image information. Then, the original image information for display that has been created is stored in the frame memory FM. This allows the original image OI to be displayed on the image display section 17. The original image OI illustrated in FIG. 5 is a picture of a glass wall portion of a building. In this original image OI, the diagonally shaded portions are the shadows on the glass. On the upper right side of the wall portion, the picture includes a plate PL with letters "EPS" drawn thereon. On this plate PL, the letters "EPS" are drawn in blue on a white background.

Figure 6:
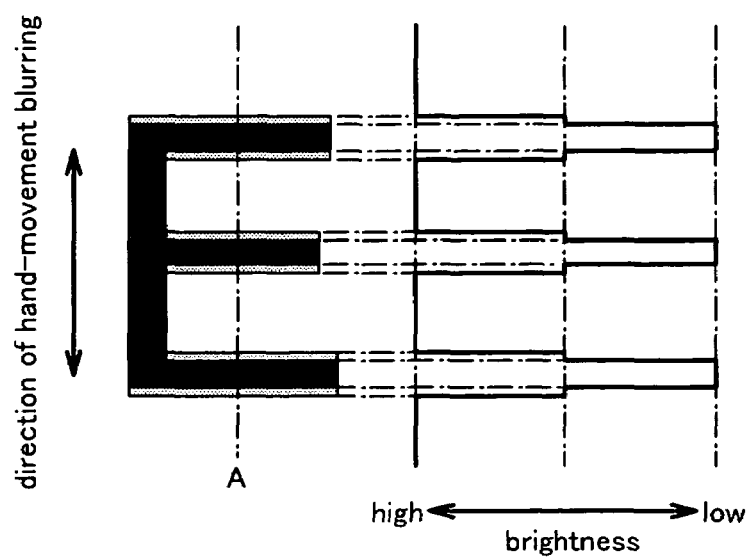
FIG. 6 is a hand-movement blurred image and the brightness of a portion indicated by symbol "A" in this hand-movement blurred image.

Once the original image OI is displayed, the controller 40 defines a confirmation range CF based on the original image information (S42 to S48). As described above, the confirmation range CF is defined in order to precisely show the effect of a correction by indicating a range in which the effect of the correction can be easily recognized. The confirmation range CF is set using the orientation of hand-movement blurring. Now, the reason for this will be briefly explained. Here, FIG. 6 is a diagram showing an image blurred due to hand movement, and the brightness of a portion indicated by symbol "A" in the image blurred due to hand movement.

The hand-movement blurring, which is caused by a camera being moved at the time of exposure, refers to a phenomenon in which a subject flows in the direction of the movement of the camera when exposed. Accordingly, a blurred image may also be considered to be formed of a plurality of images overlapped in the direction of the blurring. The image of letter "E" shown in FIG. 6 includes two letters of "E" that are slightly displaced vertically from each other. Here, assuming that the letter "E" is drawn in blue and the background is in white, the white background thus has the highest brightness value in this image. Portions where the upper image and the lower image overlap each other, i.e., the highly colored portions shown in the figure are less prone to be affected by the background portion, and thus, the brightness thereof has the lowest value in this image. That is, the brightness corresponds to the blue color. On the other hand, a portion only having either the upper blurred image or the lower blurred image, i.e., an intermediately colored portion in the figure is affected by the background portion to become light blue. Accordingly, the brightness is lower than that of the background portion but higher than that of the overlapped portion of the blurred images. Consequently, the occurrence of the hand-movement blurring causes an edge to appear in the direction of hand-movement blurring between the background and the upper blurred image, and between the background and the portion of only the lower blurred image. Likewise, an edge also appears in the direction of hand-movement blurring between the portion of only the upper blurred image and the overlapped portion of the blurred images, and between the portion of only the lower blurred image and the overlapped portion of the blurred images. The effect of correcting for hand-movement blurring is commonly carried out in accordance with the edge. Accordingly, the orientation of hand-movement blurring is acquired to define a portion having many edges in the orientation of hand-movement blurring as the confirmation range CF, thereby making it possible to show more precisely the effect of a correction.

Now, a more detailed explanation is given as to how to define the confirmation range CF. To set the confirmation range CF, first, the operator is requested to enter the orientation of hand-movement blurring (S42) Here, the controller 40 conveys a message to prompt the operator to enter the orientation of hand-movement blurring. For example, the controller 40 allows the prompt message to be displayed on the image display section 17. Then, the operator visually checks the orientation of hand-movement blurring in the original image OI and enters the orientation. The orientation of hand-movement blurring is entered, for example, using the four-way button 23. The controller 40 acknowledges the entered hand-movement-blurring orientation in accordance with the output from the four-way button 23 (which corresponds to the hand-movement-blurring orientation information). Then, the controller 40 allows an indicator image ID indicative of the acknowledged hand-movement-blurring orientation to be displayed on the image display apparatus. The illustrated indicator image ID includes a circle and an arrow indicative of the orientation of hand-movement blurring. This direction of the arrow is defined according to the entered hand-movement-blurring orientation. For example, if the entered hand-movement-blurring orientation is in the vertical direction, the arrow is directed vertically as shown in FIG. 5. On the other hand, if the entered hand-movement-blurring orientation is in the horizontal direction, the arrow is directed horizontally. In this embodiment, the indicator image ID is superimposed (shown in an overlapped state) on the original image OI; however, the invention is not limited to this mode. For example, a display area for the indicator image ID and another display area for the original image OI may be defined on the image display section 17, so that the indicator image ID and the original image OI are displayed on each display area. In other words, the orientation of hand-movement blurring and the original image OI only have to be displayed in association with each other.

Figures 7, 8A, 8B, 8C:
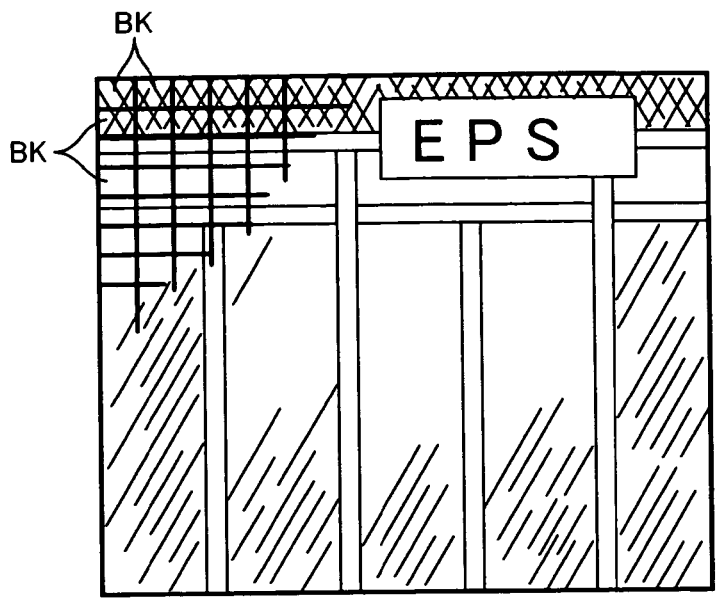
FIG. 7 is an explanatory schematic diagram showing the relationship between the original image information and the block.
FIG. 8A is an explanatory diagram illustrating an X-direction Sobel filter used to produce an edge gradient dx.
FIG. 8B is an explanatory diagram illustrating a Y-direction Sobel filter used to produce an edge gradient dy.
FIG. 8C is an explanatory schematic diagram illustrating the range of 3 by 3 pixels about a pixel $P(i,j)$ and the brightness Y of a pixel P within this range.

After the orientation of hand-movement blurring has been entered, the controller 40 divides the original image information into a plurality of rectangular blocks BK (S44). Here, FIG. 7 is an explanatory schematic diagram illustrating the relationship between the original image information and the blocks BK. It is mainly for higher-speed processing that the original image OI is divided into a plurality of blocks BK. That is, in this embodiment, the quantity of edges is quantized (quantified) on a per block BK basis, thereby allowing the quantities of edges to be easily compared with each other. Furthermore, the confirmation range CF is defined with reference to the block BK, thereby making it easy to define the range. The number of blocks BK can be determined as appropriate. For example, original image information can be divided vertically into 32 equal parts and horizontally into 32 equal parts, thereby into a total of 1024 blocks BK. For convenience in illustration, FIG. 7 illustrates part of the entire range of blocks BK that have been divided vertically into 16 equal parts and horizontally into 16 equal parts.

Then, the controller 40 calculates an edge strength E in the orientation of hand-movement blurring on a per block BK basis (S46). Here, FIG. 8A is an explanatory diagram illustrating an X-direction Sobel filter used to produce an edge gradient dx. FIG. 8B is an explanatory diagram illustrating a Y-direction Sobel filter used to produce an edge gradient dy. FIG. 8C is an explanatory schematic diagram illustrating the range of 3 by 3 pixels centering on a certain pixel P(i, j) and the brightness Y of a pixel P within this range.

The edge strength E is an indicator of the degree of being an edge and is defined in accordance with the edge gradients dx and dy (the horizontal edge gradient dx and the vertical edge gradient dy). Accordingly, before the edge strength E is acquired, brightness image information and the edge gradients dx and dy are acquired. The brightness image information is acquired by converting original image information indicated by RGB graduation values into image information represented by the YIQ color space to acquire Y-channel information indicative of brightness. That is, the acquired Y-channel information is the brightness image information. The edge gradients dx and dy are acquired in accordance with the brightness image information. Accordingly, the controller 40 applies, to the acquired brightness image information, the horizontal (X-direction) Sobel filter (FIG. 8A) and the vertical (Y-direction) Sobel filter (FIG. 8B). The Sobel filter is a 3×3 matrix of 9 elements.

Such a Sobel filter is applied to obtain the edge gradients dx and dy. In other words, obtained are an image indicative of pixels in which the brightness Y changes significantly in the horizontal direction and an image indicative of pixels in which the brightness Y changes significantly in the vertical direction. Below, the application of the Sobel filter will be briefly described. For example, the application of the Sobel filter to the pixel P(i, j) shown in FIG. 8C is to calculate the products of the brightness Y(i−1, j−1) to Y(i+1, j+1) of 3×3 pixels present in the vicinity of the pixel P and the corresponding elements in the Sobel filter, and then find the sum of the resulting nine products. When the X-direction Sobel filter is applied to the pixel P(i, j), the resulting edge gradient dx(i, j) can be expressed by the following equation (1).

$$dx(i, j) = [Y(i+1, j-1) + 2 \times Y(i+1, j) + Y(i+1, j+1)] - [Y(i-1, j-1) + 2 \times Y(i-1, j) + Y(i-1, j+1)] \quad (1)$$

Once the edge gradient is obtained, the edge strength E is calculated for the orientation of hand-movement blurring. The edge strength E is expressed by the following equation (2) and calculated for each angle. The equation (2) shows that the edge strength E(θ) for angle θ is expressed by the sum of the absolute value (ABS) of cos θ·dx+sin θ·dy, and is the total sum of the edge gradients dx and dy in the orientation of hand-movement blurring.

$$E(\theta) = \sum_j \sum_i [ABS(\cos\theta \cdot dx(i, j) + \sin\theta \cdot dy(i, j))] \quad (2)$$

Then, the controller 40 performs the calculation of the equation (2) on a per block BK basis. This allows the edge strength E in the orientation of hand-movement blurring to be calculated on a per block BK basis. Here, FIG. 9 is a schematic diagram illustrating the relationship between the edge strength E and the blocks BK. For convenience in illustration, this figure also shows a 16×16 matrix of 256 blocks BK. Additionally, the edge strength E is indicated in three levels. More specifically, a block BK with many edges is indicated in white, while a block BK with fewer edges is indicated in black. On the other hand, a block BK with an intermediate quantity of edges is indicated in halftone. This figure shows that there are more edges at the portion of the plate PL located in the upper right on the wall portion, and fewer edges in the shadow portion (dark portion).

Once the edge strength E in the orientation of hand-movement blurring is calculated for each block BK, the controller 40 identifies the block BK with the maximum calculated edge strength E to set the confirmation range CF (S48). In this process, the controller 40 first identifies the block BK with the maximum edge strength E. Once this block BK is identified, the controller 40 defines the confirmation range CF. Here, the confirmation range CF is defined to meet the following conditions. The first condition is to define the confirmation range CF so as to contain the identified block BK. The second condition is to define the confirmation range CF in units of blocks BK. The third condition is to keep the aspect ratio of the original image OI unchanged. The fourth condition is to define the confirmation range CF so that it fits within the size of the corrected image display area 17b (see FIG. 12).

Figure 12:
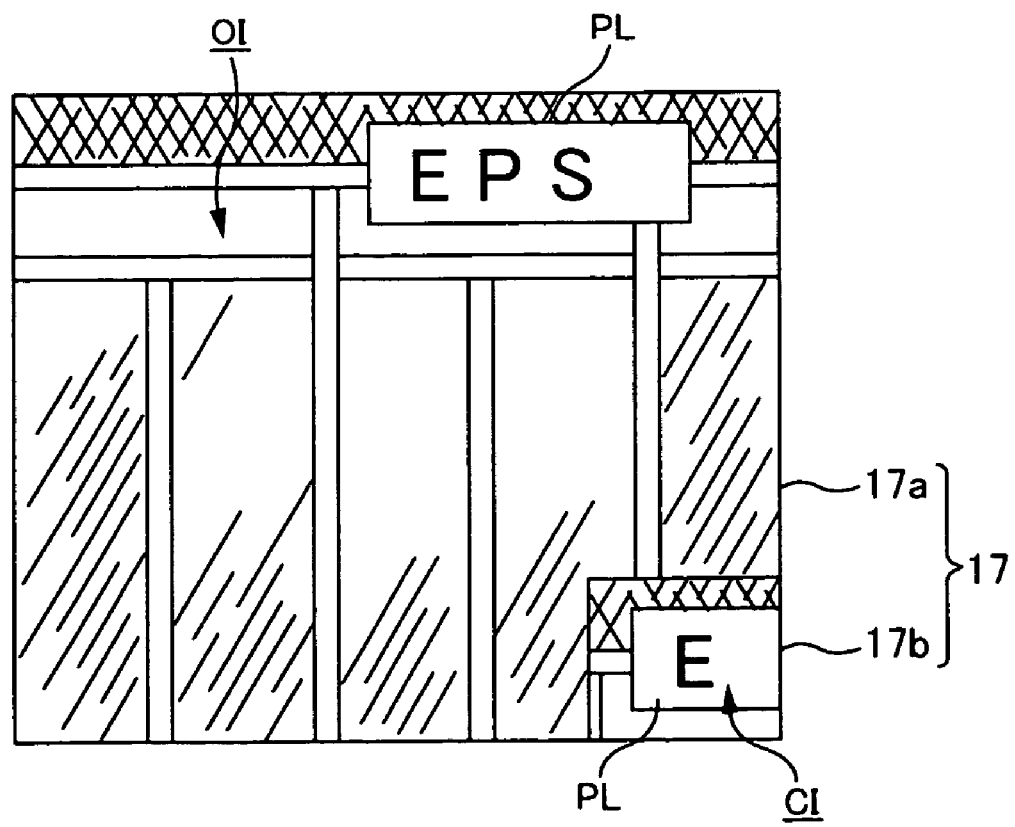
FIG. 12 is a display example of a confirmatory corrected image and an original image.

Here, a supplemental description will be given to the first and fourth conditions. In the first condition, the confirmation range CF is defined, as a rule, so that the identified block BK is located at the center. However, when it is difficult to locate the identified block BK at the center of the confirmation range CF, for example, when the identified block BK is present at a corner of the image display section 17, the confirmation range CF is defined so as to contain the identified block BK. As regards the fourth condition, the corrected image display area 17b is an area for displaying a corrected image and defined on the image display section 17. It should be noted that as shown in FIG. 12, the corrected image display area 17b according to this embodiment has a size that is one sixteenth of the image display section 17, and is provided in the lower right corner of the image display section 17.

Taking the aforementioned conditions into account, the controller 40 defines the confirmation range CF. In the example of FIG. 9, as indicated by a bold frame, the range of a 4×4 matrix of blocks BK, with the letter "E" on the plate PL located in the center, is defined as the confirmation range CF.

Figure 10:
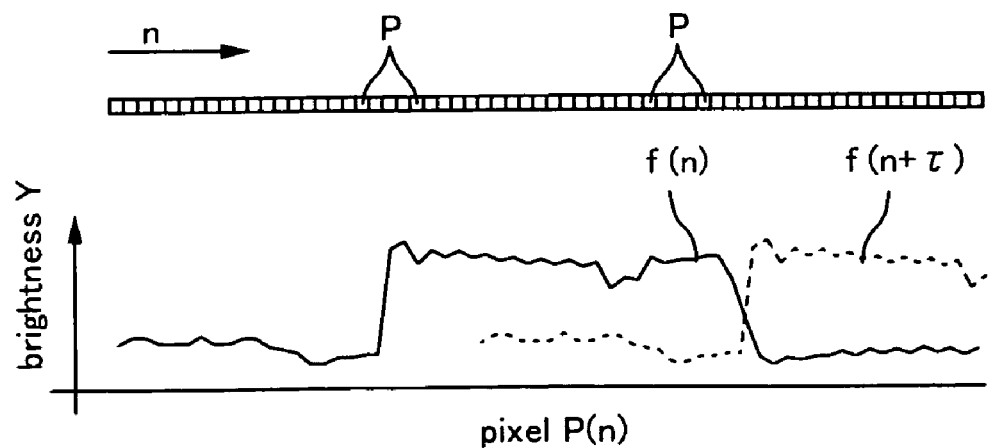
FIG. 10 is an explanatory diagram illustrating the function $f(n)$ of the pixel and brightness.
Figure 11:
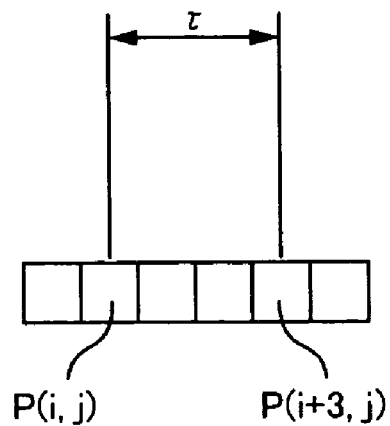
FIG. 11 is an explanatory schematic diagram showing an autocorrelation function.

Once the confirmation range CF is set, the controller 40 extracts the image information in the confirmation range CF from the original image information to correct the resulting information (S50). That is, the original image information in the confirmation range CF is corrected to thereby create the corrected image information. Here, FIG. 10 is an explanatory diagram illustrating the function f(n) of the pixel and brightness Y. FIG. 11 is an explanatory schematic diagram showing an autocorrelation function. In this example, hand-movement blurring is corrected. Here, the amount of hand-movement blurring (i.e., hand-movement-blurring amount information indicative of the amount of hand-movement blurring) is determined in relation to the image information within the confirmation range CF, and a correction is made in accordance with the entered hand-movement-blurring orientation and the determined amount of hand-movement blurring. As described above, since the hand-movement blurring is a phenomenon in which a subject flows when exposed, a certain point on the subject is captured as a line across the range that corresponds to the amount of hand-movement blurring. Since the line is a series of the same points on the subject, there is a strong correlation in color between them. In this embodiment, attention is focused on this correlation to determine the amount of hand-movement blurring. First, as shown in FIG. 10, the controller 40 determines the function f(n) of the pixel and brightness Y in the orientation of hand-movement blurring. Then, with the determined function f(n), the autocorrelation function ACFk($\tau$) is derived which is shown in the following equation (3), and a displacement $\tau$ with the lowest value of the autocorrelation function ACFk($\tau$) is determined to be the amount of hand-movement blurring. That is, the controller 40 calculates the autocorrelation function ACFk ($\tau$) with the determined function f(n) while shifting the pixel in the orientation of hand-movement blurring, thereby obtaining the amount of hand-movement blurring.

$$ACFK(\tau) = \frac{1}{N}\sum_{n=0}^{N-1} f(n) \cdot f(n+\tau) \quad (3)$$

From the equation (3), the amount of hand-movement blurring can be conceived to be a displacement $\tau$ with the lowest value of the autocorrelation function ACFk($\tau$) More specifically, the autocorrelation function ACFk($\tau$) is obtained by calculating the product of the original function f(n) and the function f(n+$\tau$), derived by shifting the original function f(n) by the displacement $\tau$, for each of N pixels (i.e., pixels n=0 to N−1) and finding the average value thereof (1/N). Here, assuming that the displacement $\tau$ is 0, each pixel of the function f(n) and each pixel of the function f(n+$\tau$) coincide with each other, thus resulting in the highest value of the autocorrelation function ACFk($\tau$). Each time the displacement $\tau$ increases as 1, 2, and so on, the function f(n+$\tau$) will be shifted from the function f(n) Thus, the degree of coincidence of the pixel of the function f(n) and the pixel of the function f(n+$\tau$) is degraded. Consequently, each time the displacement $\tau$ increases, the autocorrelation function ACFk($\tau$) will decrease. When a displacement $\tau$ corresponding to the amount of hand-movement blurring is set, the function f(n+$\tau$) does not coincide with the function f(n) as shown by a dotted line in FIG. 10, thus resulting in the autocorrelation function ACFk($\tau$) indicating the minimum value. As the displacement $\tau$ is further increased, there will be no correlation between the function f(n) and the function f(n+$\tau$), resulting in the autocorrelation function ACFk ($\tau$) indicating a value higher than the aforementioned minimum value but an indefinite value.

For example, as shown in FIG. 11, when there occurs a horizontal hand-movement blur over three pixels, the values of the brightness Y of the pixels become almost the same from a pixel P(i, j) to a pixel P(i+3, j) which is three pixels away therefrom. In this case, with a displacement $\tau$ of four (pixels), the blurred portion of the function f(n) and the blurred portion of the function f(n+$\tau$) will not coincide with each other, thus resulting in the autocorrelation function ACFf($\tau$) indicating the minimum value. As described above, with the autocorrelation function ACFf($\tau$), the displacement $\tau$ indicating the minimum value can be said to be indicative of the amount of hand-movement blurring.

It should be noted that to detect the amount of hand-movement blurring with higher accuracy, a plurality of sample lines may be used, and the amount of hand-movement blurring may be found in accordance with the autocorrelation function ACFk($\tau$) determined on each sample line. This makes it possible to obtain the amount of hand-movement blurring with high accuracy, e.g., when there occurs a hand-movement blur along an arcuate orbit.

Once the amount of hand-movement blurring is acquired in this manner, the pixel is, for example, shifted in the direction of hand-movement blurring that has been entered to correct the hand-movement blurring with respect to the image information in the confirmation range CF. This allows for creating confirmatory corrected image information. At this time, the confirmation range CF has a size smaller than the range defined by the original image information (for convenience sake, also referred to as the entire range), thus resulting in the processing being performed at higher speeds.

After the confirmatory corrected image information has been created, the controller 40 allows a confirmatory corrected image CI and the original image OI to be displayed on the image display section 17 (S52) Here, the confirmatory corrected image CI is an image that is based on the confirmatory corrected image information. FIG. 12 shows a display example of the confirmatory corrected image CI and the original image OI. As described above, in this embodiment, the corrected image display area 17b is defined at a lower right corner of the image display section 17. For this reason, the confirmatory corrected image CI is displayed on the corrected image display area 17b. On the other hand, the original image OI is displayed on an area other than the corrected image display area 17b in the image display section 17 (hereinafter also referred to as an original image display area 17a). That is, the confirmatory corrected image CI and the original image OI are displayed at the same time. In this embodiment, this arrangement allows the original image OI displayed on the original image display area 17a and the confirmatory corrected image CI displayed on the corrected image display area 17b to contrast with each other, thereby facilitating visual confirmation of the effect of a correction.

Once the confirmatory corrected image CI and the original image OI are displayed, the controller 40 checks whether or not to overwrite the original image information with the image information corrected under the specified conditions (the orientation of hand-movement blurring and the amount of hand-movement blurring) (i.e., whether or not to store the corrected original image information in the storage medium to replace the original image information to be corrected) (S54). Here, the controller 40 prompts the operator to check whether or not to perform the overwriting. For example, the controller 40 allows a message prompting confirmation to be displayed on the image display section 17. If the operator issues an overwrite instruction, the controller 40 corrects the entire original image information, and then overwrites the external flash memory MO with the corrected original image information (S56). The method for correcting the original image information is the same as the aforementioned one, and thus will not be described again. On the other hand, if the operator does not issue an overwrite instruction, the process returns to the hand-movement-blurring orientation entry (S42), allowing the operator to modify (re-enter) the orientation of hand-movement blurring. Then, based on the modified hand-movement-blurring orientation, the aforementioned processing is repeated (S44 to S54). In this way, this embodiment provides a chance to modify the entered hand-movement-blurring orientation, thereby making it possible to efficiently make a desired correction even when the previously entered hand-movement-blurring orientation has not resulted in a sufficient correction.

By the way, according to this flowchart, the confirmation range CF is to be re-defined based on the modified hand-movement-blurring orientation. However, the second and subsequent processes are preferably arranged to use the already-defined confirmation range CF as it is. This is because the confirmation range CF being fixed to the already-defined range facilitates the comparison with the previous correction conditions. That is, the comparison using the same confirmation range CF makes the effect of a correction more distinct between before and after the modification. To perform this processing, in the second and subsequent processes, the process allows the operator to enter the orientation of hand-movement blurring in step S42, and thereafter, as shown by a dotted arrow, proceeds to step S50 to correct the image in the confirmation range CF. After that, in step S52, the process allows the confirmatory corrected image CI and the original image OI to be displayed on the image display section 17, and in step S54, checks whether or not to perform overwriting.

After the external flash memory MO is overwritten with the corrected original image information, the controller 40 checks whether or not there is another image that is to be corrected (S58). If there is another image, then the process allows for displaying that other image being corrected (S40), and thereafter, repeats the aforementioned processing. On the other hand, if there is no other image, the image information correction process is ended (S20), and the processing in accordance with the defined mode is performed (S10 to S22; see FIG. 3).

Second Embodiment

Figure 13:
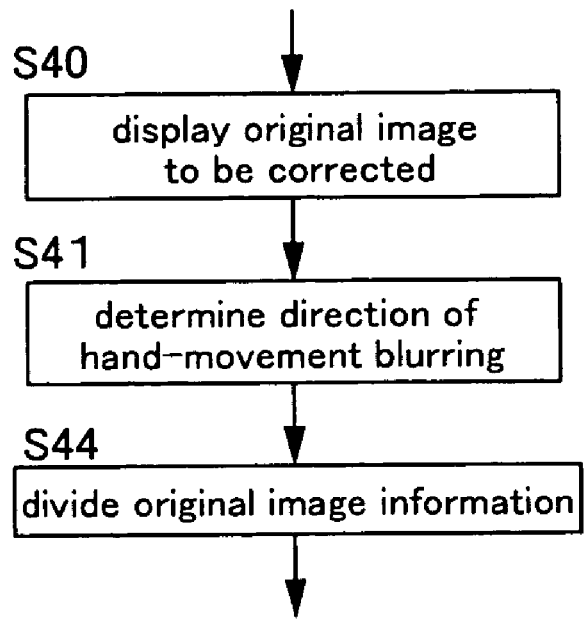
FIG. 13 is an explanatory flowchart showing the main section of a process according to a second embodiment.
Figure 14:
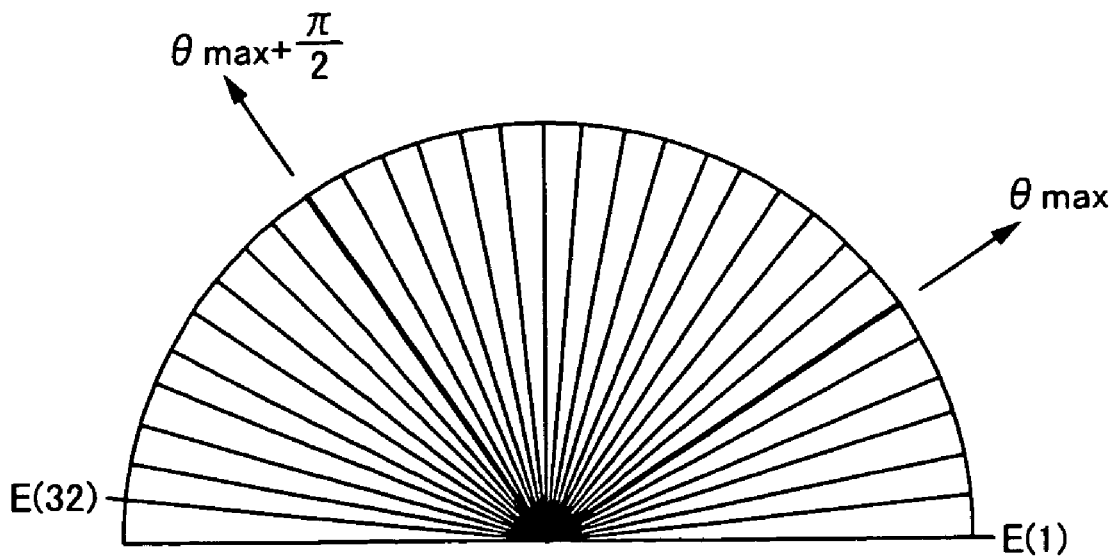
FIG. 14 is an explanatory schematic diagram illustrating the relationship between the orientation of the maximum edge strength E ($\theta$max) and the orientation of hand-movement blurring ($\theta$max+$\pi$/2).

The aforementioned first embodiment employs the four-way button 23 as the hand-movement-blurring-orientation input section to allow the operator to enter the orientation of hand-movement blurring. This arrangement allows for entering the orientation of hand-movement blurring, thus advantageously making it possible to readily know the relationship between the entered hand-movement-blurring orientation and the effect of a correction. However, it is also possible to determine the orientation of hand-movement blurring from the original image information. Now, a description will be given to the second embodiment that is arranged for this purpose. Here, FIG. 13 is an explanatory flowchart showing the main portion of a process according to the second embodiment. FIG. 14 is an explanatory schematic diagram illustrating the relationship between the orientation with the maximum edge strength E ($\theta$max) and the orientation of hand-movement blurring ($\theta$max+$\pi$/2).

In the second embodiment, the controller 40 finds the hand-movement-blurring orientation information from the original image information, and then defines a confirmation range CF based on the determined hand-movement-blurring orientation information. To do so, as shown in the flowchart of FIG. 13, the controller 40 displays an original image OI (S40), thereafter determines the orientation of hand-movement blurring (S41), and divides the original image information (S44). After that, the controller performs the same processing as in the first embodiment described above. In other words, the second embodiment performs a hand-movement-blurring-orientation determination process (S41) in place of the hand-movement-blurring-orientation input process (S42) in the first embodiment. Now, the hand-movement-blurring-orientation determination process will be described below.

The orientation of hand-movement blurring is determined based on the aforementioned edge strength E. That is, the angle $\theta$max with the greatest edge strength E can be said to be an angle at which the largest number of edges appears in the original image OI. Suppose that a hand-movement blur has occurred at the time of exposure. An edge in the same orientation as that of the hand-movement blur flows in the same direction as that of the hand-movement blur and is thereby blurred. However, an edge perpendicular to the orientation of hand-movement blurring is apt to remain as an edge even when flowing in the same direction as that of the hand-movement blur. From this, it can be said that the angle $\theta$max with the greatest edge strength E is in the orientation at right angle to the orientation of hand-movement blurring. From such a point of view, the second embodiment first finds the angle $\theta$max with the great edge strength E, and then takes the orientation perpendicular to the angle $\theta$max as the orientation of hand-movement blurring.

Now, the procedure will be described below. First, the controller 40 converts the original image information into the YIQ image information. Then, the horizontal Sobel filter (FIG. 8A) and the vertical Sobel filter (FIG. 8B) are applied to the Y-channel image information in the converted YIQ image information to obtain the horizontal edge gradient dx and the vertical edge gradient dy. After the edge gradients dx and dy have been obtained, an angle at which an edge appears most distinctly is determined from these edge gradients dx and dy. Here, with the half circle shown in FIG. 14, the controller 40 calculates the edge strength E($\theta$n) on a per evaluation angle $\theta$n (n=1 to 32) basis. That is, based on the aforementioned equation (2), an edge strength E($\theta$) is calculated while changing the angle $\theta$ at intervals of $\pi$/32. Then, in accordance with each resulting edge strength E($\theta$), the angle $\theta$max with the greatest edge strength E is acquired. The angle $\theta$max can be said to be the orientation in which the largest number of edges appears, and therefore the angle $\theta$max+$\pi$/2, which is perpendicular to the angle $\theta$max, corresponds to the orientation of hand-movement blurring.

Once the orientation of hand-movement blurring is determined in this manner, the controller 40 performs the aforementioned processing (S44 onward). According to such a digital camera 1, the controller 40 determines the orientation of hand-movement blurring based on the original image information, thereby making it possible to simplify the operation and improve the usability. In this embodiment, the orientation of hand-movement blurring determined by the controller 40 may be modified using the four-way button 23. Such an arrangement makes it possible to efficiently make a desired correction as in the first embodiment.

Other Embodiments

The foregoing descriptions are directed to an embodiment of the digital camera 1; however, the descriptions include the disclosure of a computer system, a program, and a storage medium having a program stored thereon. Furthermore, as an embodiment, the description was given to the digital camera 1; however, this embodiment is intended to facilitate the understanding of the present invention and is not to be construed as limiting the present invention. The present invention may be modified and improved without departing from the spirit and scope of the invention. The present invention also includes all such equivalents thereof. In particular, embodiments to be described below shall also be covered by the present invention.

<What is to be Corrected>

In the aforementioned embodiment, the correction of hand-movement blurring was described; however, the correction to be made is not limited to hand-movement blurring. For example, the correction may also be made to out-of-focus blurring. Then, as in the aforementioned embodiment, the hand-movement blurring may be corrected for, thereby making it possible to precisely show the effect of correcting for the hand-movement blurring that is apt to occur in a photographic apparatus such as the digital camera 1. Furthermore, using the confirmation range CF identified based on the quantity of edges makes it possible to show the effect of correcting for the hand-movement blurring in an easy-to-understand manner.

<How to Display the Confirmatory Corrected Image CI>

In the aforementioned embodiment, as described with reference to FIG. 12, part of the image display section 17 was used as the corrected image display area 17*b* on which the confirmatory corrected image CI is displayed, while another part was used as the original image display area 17*a* on which the original image OI is displayed. This arrangement allows for simultaneously displaying the confirmatory corrected image CI and the original image OI, thereby advantageously facilitating the contrast therebetween. However, the way of displaying the confirmatory corrected image CI and the original image OI is not limited to this display arrangement. For example, the original image OI and the confirmatory corrected image CI may be switched for display. In this case, the controller 40 allows the original image OI and the confirmatory corrected image CI to be displayed on the image display section 17 in accordance with the original image information and the corrected image information in the confirmation range CF. In addition, the original image OI and the confirmatory corrected image CI may be switched at predetermined time intervals (e.g., at intervals of a few seconds), or may also be switched in accordance with the output from a switching control section such as the four-way button 23. In this arrangement, it is possible to display a corrected image without taking the original image OI into account. For example, the corrected image in the confirmation range CF can be enlarged for display. Accordingly, it is advantageously possible to optimally display the corrected image. In particular, this way of displaying is also effective for a photographic apparatus, such as the digital camera 1, in which the image display section 17 has a small display area.

<Application>

In the aforementioned embodiments, the description was given to the embodiments of the digital camera 1; however, the present invention is not limited to these embodiments. The present invention is also applicable even to a system so long as it has the image display section 17 and the controller 40 (or a computer) and is capable of acquiring original image information to be corrected. Such a system includes, for example, a personal computer having retouch software installed therein or a printing apparatus capable of printing image information stored in an external flash memory MO.

What is claimed is:

1. An image correcting method comprising:
    acquiring original image information to be corrected;
    dividing the original image information into a plurality of blocks;
    calculating a quantity of edges for each of the blocks;
    identifying a block with the maximum quantity of edges;
    setting a confirmation range for confirming an effect of a correction so as to include the block with the maximum quantity of edges;
    calculating an edge strength while changing an angle at intervals of $\pi/32$;
    acquiring a first angle with greatest edge strength; and
    setting a second angle that is perpendicular to the first angle with the greatest edge strength as an orientation of hand-movement blurring,
    wherein the quantity of edges for each of the blocks is calculated based on the orientation of hand-movement blurring.

2. The image correcting method according to claim 1, further comprising:
    calculating hand-movement-blurring amount information indicative of an amount of hand-movement blurring based on hand-movement-blurring orientation information; and
    correcting the hand-movement blurring of the original image information within the confirmation range in accordance with the hand-movement-blurring amount information to produce corrected image information.

3. The image correcting method according to claim 2, further comprising:
    displaying, on an image display section, an original image based on the original image information and a corrected image based on the corrected image information.

4. The image correcting method according to claim 3, further comprising:
    after displaying the corrected image on the image display section, confirming whether or not to modify hand-movement-blurring orientation information.

5. The image correcting method according to claim 4, further comprising:
    when the hand-movement-blurring orientation information is modified, correcting the original image information within the confirmation range that has been set prior to the time of the modification.

6. The image correcting method according to claim 3, further comprising:
    displaying the original image on an original image display area of the image display section; and
    displaying the corrected image on a corrected image display area of the image display section.

7. The image correcting method according to claim 3, further comprising:
    switching between the original image and the corrected image for display on the image display section.

8. The image correcting method according to claim 7, further comprising:
    enlarging the corrected image for display on the image display section.

9. The image correcting method according to claim 2, further comprising:

displaying, based on the hand-movement-blurring orientation information, an indicator image for indicating the orientation of hand-movement blurring.

10. The image correcting method according to claim 9, further comprising:
displaying the indicator image overlapped on the original image.

11. The image correcting method according to claim 9, further comprising:
displaying the indicator image on an indicator image display area of an image display section.

12. The image correcting method according to claim 1, further comprising:
setting a plurality of sample lines; and
calculating an orientation of hand-movement blurring in accordance with an autocorrelation function determined on each sample line,
wherein the quantity of edges for each of the blocks is calculated based on the orientation of hand-movement blurring.

13. The image correcting method according to claim 1, further comprising:
detecting the edges based on hand-movement-blurring orientation information output from a hand-movement-blurring-orientation input section,
wherein the hand-movement-blurring-orientation input section outputs the hand-movement-blurring orientation information based on an orientation of hand-movement blurring that is entered.

14. The image correcting method according to claim 1, further comprising:
finding hand-movement-blurring orientation information from the original image information; and
detecting the edge based on the hand-movement-blurring orientation information.

15. The image correcting method according to claim 1, further comprising:
storing corrected original image information in a storage medium in place of the original image information to be corrected.

16. An image correcting apparatus comprising:
a controller, wherein the controller acquires original image information to be corrected; divides the original image information into a plurality of blocks; calculates a quantity of edges for each of the block identifies a block with the maximum quantity of edges;
sets a confirmation range for confirming an effect of a correction so as to include the block with the maximum quantity of edges;
calculates an edge strength while changing an angle at intervals of $\pi/32$;
acquires a first angle with greatest edge strength; and sets a second angle that is perpendicular to the first angle with the greatest edge strength as an orientation of hand-movement blurring, wherein the quantity of edges for each of the blocks is calculated based on the orientation of hand-movement blurring.

17. The image correcting apparatus according to claim 16, wherein the original image information is stored in a storage medium by a photographic apparatus; and
wherein the photographic apparatus includes:
a photoelectric conversion section for converting an optical image of a photographed object into electrically produced image information, and
a shutter control section on which a predetermined manipulation is performed when storing the image information in the storage medium.

18. The image correcting apparatus according to claim 17, wherein the original image information is printed by a printing apparatus.

19. A medium having a program stored thereon, the program comprising: a code for allowing a computer constituting an image correcting apparatus to operate to acquire original image information to be corrected from a storage medium;
a code for allowing the computer to operate to divide the original image information into a plurality of blocks; a code for allowing the computer to operate to calculate a quantity of edges for each of the blocks; a code for allowing the computer to operate to identify a block with the maximum quantity of edges; a code for allowing the computer to operate to set a confirmation range for confirming an effect of a correction so as to include the block with the maximum quantity of edges; a code for allowing the computer to calculate an edge strength while changing an angle at intervals of $\pi/32$ a code for allowing the computer to acquire a first angle with greatest edge strength; and a code for allowing the computer to set a second angle that is perpendicular to the first angle with the greatest edge strength as an orientation of hand-movement blurring, wherein the quantity of edges for each of the blocks is calculated based on the orientation of hand-movement blurring.

* * * * *